United States Patent [19]
Morris

[11] Patent Number: 5,585,121
[45] Date of Patent: Dec. 17, 1996

[54] ADJUSTABLE SHEAR PLATE FOR BLOW MOLDING MACHINE

[75] Inventor: Terry L. Morris, Jackson, Mich.

[73] Assignee: Allied Tool, Inc., Michigan Center, Mich.

[21] Appl. No.: 558,388

[22] Filed: Nov. 16, 1995

[51] Int. Cl.⁶ .................................................. B29C 49/50
[52] U.S. Cl. .......................... 425/168; 425/525; 425/527; 425/531
[58] Field of Search ................................. 425/168, 525, 425/527, 531, 535

[56] References Cited

U.S. PATENT DOCUMENTS

| | | | |
|---|---|---|---|
| 3,470,582 | 10/1969 | Martin, Jr. ................................ | 425/527 |
| 4,032,278 | 6/1977 | Kuenzig et al. ......................... | 425/531 |
| 4,923,385 | 5/1990 | Spoetzl .................................... | 425/527 |
| 5,256,055 | 10/1993 | Morris ..................................... | 425/527 |

*Primary Examiner*—Robert Davis
*Attorney, Agent, or Firm*—Duncan F. Beaman

[57] ABSTRACT

An adjustable shear plate for blow molding equipment wherein the shear steels or plates for cutting off the neck of the blown product, usually a bottle, may be adjustable with respect to each other to compensate for wear and achieve a sharp definitive severance. The adjustable components include a shear plate holder movably mounted upon a top plate or block support, and a slide selectively positionable upon the top plate support is operated by a rotatable cam to position the shear plate holder as desired. Rotation of the cam displaces the slide to engage and adjustably position the shear plate holder and shear plates mounted thereon.

12 Claims, 3 Drawing Sheets

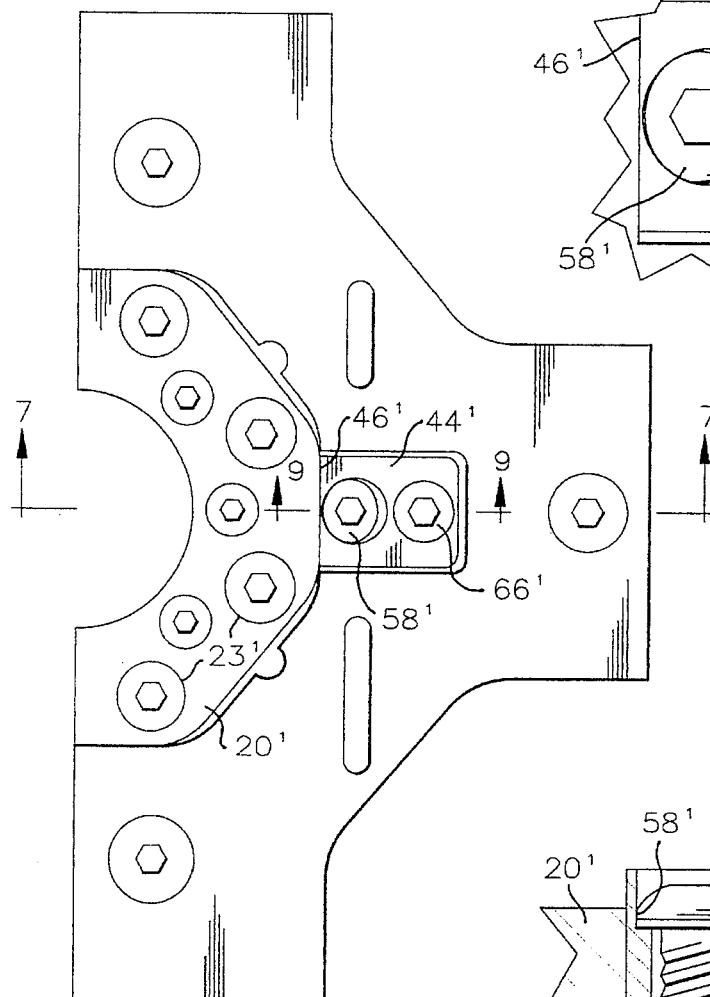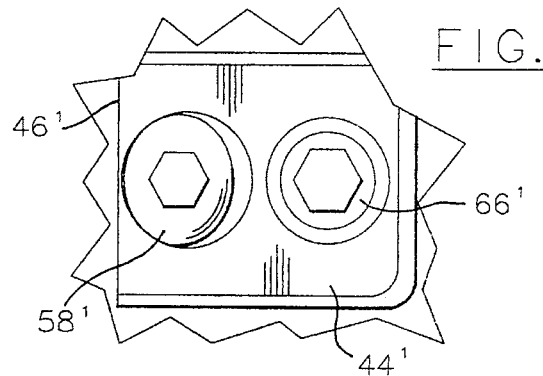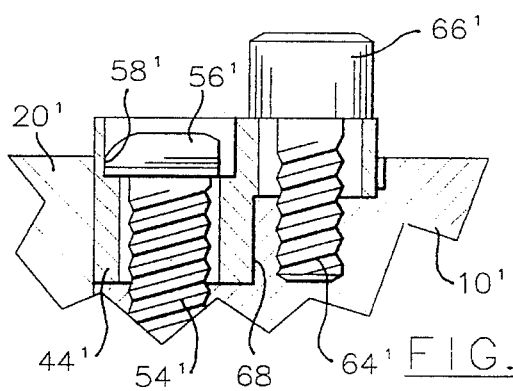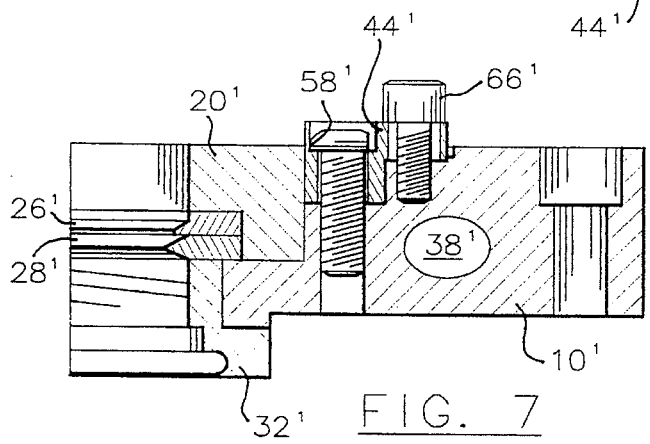

ADJUSTABLE SHEAR PLATE FOR BLOW MOLDING MACHINE

BACKGROUND OF THE INVENTION

1. Field of the Invention

The invention pertains to blow molding apparatus such as used to blow mold beverage containers and the like utilizing shear plates or steels to sever the neck of the blown product, the shear plates being in the form of segments mounted upon displaceable top plates movable toward each other.

2. Description of the Related Art

Blow molding apparatus is widely used to economically form synthetic plastic containers such as those used in the sale of milk, soft drinks, cleaning liquids, etc. In such molding processes, a heated parison is inserted into the mold, subjected to internal compressed air which forces the thermoplastic material into engagement with the mold walls to assume the configuration of the mold, and after forming, the blow pin is raised to shear the bottle neck to produce a finished product having an accurately squared neck end for receiving a cap or lid.

The mold top plates, usually two in number, are slidably supported so that they may be moved toward and away from each other to release the finished product. The top plates each support a shear steel holder which, in turn, supports arcuate shear plates or steels having sharpened inner edges. The top plates, shear steel holders and shear plates are usually each of a 180° configuration wherein opposed like components will define a complete circumferential configuration when the two top plates are moved together. Within the neck defined by the shear plate holders, the blow pin end received within the blown product cooperates with the shear plates wherein the product is pinched or sheared off by the shear plates when the blow pin is raised. This shearing off of the product neck defines a clean neck edge at the bottle opening wherein caps or lids may be applied to the bottle opening, as designed.

Blow molding apparatus forming beverage containers operates at high speeds at hundreds of cycles per hour, and although the blown thermoplastic material is soft, repeated engagement with the shear steels or plates wears and dulls the shear plates resulting in uneven, fuzzy, burred and torn container edges, and it is necessary to periodically replace the shear plates within their associated holders due to shear plate wear.

There is a need for a quick adjustment of worn shear plates, but prior to the introduction of the instant invention, practical blow molding apparatus having adjustable shear plates has not been commercially available.

OBJECTS OF THE INVENTION

It is an object of the invention to provide shear plate structure for blow molding machines wherein the shear plates are adjustable relative to each other to compensate for wear.

A further object of the invention is to provide shear plate structure for blow molding machines wherein the shear plates may be adjustable with respect to opposing shear plates to compensate for wear, and the adjustable components may be retrofitted to existing blow mold apparatus.

Yet a further object of the invention is to provide adjustable shear plate structure for blow molding machines wherein a shear plate mounted upon a shear plate holder having a fixed air seal may be adjusted relative to the air seal to compensate for wear.

SUMMARY OF THE INVENTION

The shear plate adjustable structure constituting the subject matter of the invention is mounted in a top plate of a blow molding machine. The top plates constitute supports for shear steel holders and adjustment plates and the sheer steel holders each support an air seal and a shear plate. The top plate, shear steel holder and shear plates are usually of a generally 180° configuration wherein substantially identical components are located in opposed relation and are movable toward and away from each other during the operation of the blow molding process. At the termination of the blow molding process, the top plates or blocks are moved away from each other wherein the neck inserts located within the top plates and shear plates mounted adjacent the neck insert open to permit the shaped product to be released from its mold.

In the practice of the invention, the shear plate holder and adjustment plate, in three piece shear steel holder constructions, are movably adjusted relative to the associated top plate support by a cam operated slide. Such adjustment permits opposed shear plate holders and shear plates to be adjusted relative to each to accommodate shear plate wear. In two piece shear steel constructions wherein the air seal is integrally formed in the shear steel holder, the shear plate is directly engaged by an extension of the slide for adjustment thereby. Thus, it will be appreciated that the inventive concepts may be practiced with either two piece or three piece shear steel holders, and can also be used with one piece shear steels.

The components utilizing the concepts of the invention are of relatively simple construction and may be economically manufactured. A locking screw is associated with the cam operated slide to fix the slide in the desired position, and operation of the components of the invention to permit adjustment of shear steels or plates can be accomplished by mechanics of ordinary skill.

BRIEF DESCRIPTION OF THE DRAWINGS

The aforementioned objects and advantages of the invention will be appreciated from the following description and accompanying drawings wherein:

FIG. 6 is a plan view of a top plate and associated components in accord with the invention of the type used with a three piece shear steel for forming one-half gallon containers, FIG. 7 is an elevational sectional view taken along Section 7—7 of FIG. 6, FIG. 8 is an enlarged plan view of the cam operated slide of FIG. 6, FIG. 9 is an enlarged elevational sectional view of the slide shown in FIGS. 6 and 7 as taken along Section 9—9 of FIG. 6.

DESCRIPTION OF THE PREFERRED EMBODIMENTS

Figure 1:
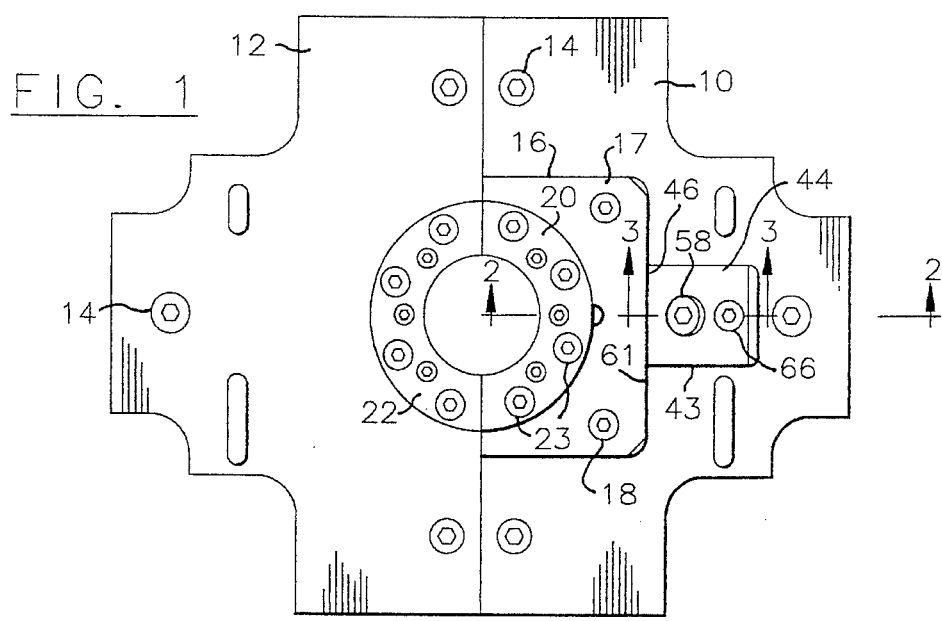
FIG. 1 is a top plan view of a typical blow molding station utilizing a pair of opposed top plates, the top plates being shown in their closed position.
Figure 2:
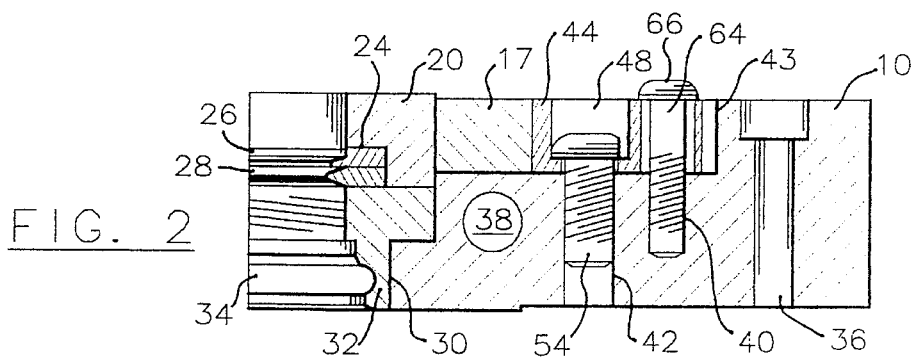
FIG. 2 is a detail elevational sectional view of a top plate assembly as taken along Section 2—2 of FIG. 1.
Figure 3:
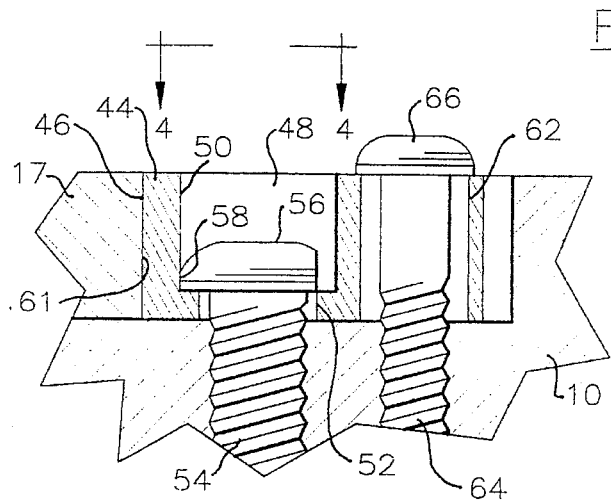
FIG. 3 is an enlarged detail elevational sectional view of the slide and cam operator illustrated in FIG. 2 as taken along Secton 3—3 of FIG. 1.

With reference to FIGS. 1 and 2, this plan view reveals a right top plate 10 and a left top plate 12 commonly associated with a mold station of a blow mold machine, not shown. The top plates are held to their supporting mold structure, not shown, by bolts 14.

Top plate 10 has a recess 16 defined therein receiving adjustment plate 17, which is held in place by bolts 18, and a shear steel holder 20 is mounted on adjustment plate 17, usually the structure of the invention is only mounted on a single top plate, but a shear steel holder 22 is mounted on top plate 12. Bolts 23 extend through the holders and mount the holders upon their respective top plate.

With reference to FIG. 2, the shear plate holder 20 is countersunk at 24 and an air seal segment 26 is located within countersink 24 as is the shear steel or plate 28 segment which is contiguously located directly under the air seal 26. As will be appreciated from FIG. 2, the air seal is provided with an inwardly extending lip or ridge, while the shear plate also includes an inwardly extending pointed ridge which accomplishes the shearing action.

The top plate 10 is countersunk at 30 for receiving the neck insert 32 having the profile 34 defined therein which forms the neck configuration of the container product being blow molded. The aforedescribed structure is conventional, and it will be appreciated that the top plate 10, its shear steel holder 20, air seal 26, shear plate 28 and neck and neck insert 32 are in the form of "segments" constituting 180° of the mold configuration they define. The other 180° of mold configuration being defined by similar components located within top plate or support 12.

The top plate 10 includes a bolt holes 36 for receiving bolts 14, and a water passage 38 is defined in the top plate wherein cooling water may circulate therethrough to keep the adjacent components relatively cool and dissipate the heat from the hot parison which is transferred to the mold during shaping. The top plate 10 is also provided with the blind threaded hole 40 and the threaded hole 42.

Figure 4:
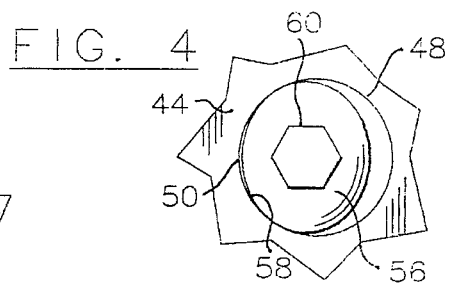
FIG. 4 is an enlarged plan view of the cam screw head as taken in the direction of Section 4—4 of FIG. 3.
Figure 5:
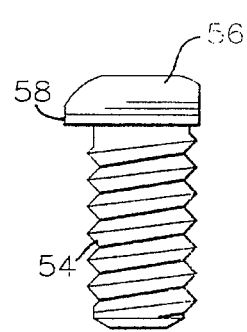
FIG. 5 is an elevational view of the cam screw, per se.

A recess 43 is defined in the top side of the top plate 10 and receives a rectangular slide 44 which is movable within the recess 43 in a left to right direction as viewed in FIGS. 1 and 2. The slide 44 includes an abutment side 46 adapted to engage the opposed edge of the adjustment plate 17 and a circular recess 48 is defined in the slide 44 having a side 50 extending toward the abutment side 46. A hole 52 defined in the slide 44 concentric to the recess 48 permits a screw 54 to be received within the top plate threaded hole 42 and the screw 54 includes a head 56 having a cam surface 58 which is eccentrically related to the axis of the screw 54. Rotation of the screw 54 and cam 58 is achieved by the hexagonal hole 60, FIG. 4, defined in the head 56. The configuration of the cam surface 58 is such that rotation of the screw 54 engages the cam 58 against the slide recess side 50 for displacing the slide to the left, FIGS. 1 and 2, wherein slide abutment side 46 will engage the edge 61 of adjustment plate 17.

The desired position of the slide 44 is maintained by a locking mechanism which includes a slot 62 formed in the slide for receiving the screw 64 having the head 66. Tightening of the screw 64 forces the slide 44 downwardly against the supporting surface within recess 43 for preventing movement of the slide.

It is to be appreciated that the holes formed in the adjustment plate 17 receiving the bolts 18 are slightly larger than the diameter of the bolt shanks extending therethrough whereupon upon slightly unloosening the bolts 18, the adjustment plate 17 and shear steel holder 20 is capable of limited movement to the left and right within the top plate 10 as viewed in FIG. 1. Likewise, the slide hole 52 is of larger diameter than screw 54 and the slot 62 is of a larger diameter than the screw 64. Accordingly, when the bolts 18, and screw 64 are slightly loosened, it is possible to displace the slide 44 on the top plate 10 by rotation of the screw 54 such that the cam 58 engages the recess side 50 and displaces the slide 44 to the left causing the slide abutment side 46 to engage the adjustment plate edge 61. This action will force the adjustment plate and steel holder 20 slightly to the left, FIG. 1, positioning the air seal 26 and shear steel plate 28 closer to the axis of the blow molding station taking up wear that has occurred in the shear plate 28. Tightening of the screw 64 locks the slide 44 in position, and tightening of the bolts 18 will lock the adjustment plate and shear plate holder 20 relative to the top plate 10. In this manner, rotation of the cam 58 may be used to accurately adjust the location of the holder 20 upon the top plate 10 to compensate for wear occurring in the shear steel 28. It will be understood that the screw shaft head 56 is never tightened down on the slide. The screw shaft 54, preferably, includes friction means which prevents rotation of the screw once the cam head and cam 58 are positioned as desired.

The blow molding structure shown in FIGS. 1–5 is typical of three piece shear steel components used in the blow molding of one gallon milk containers. If it is desired to form one-half gallon milk containers, a top plate similar to that shown in FIGS. 6–8 is employed except that an adjustment plate is not employed, and in these figures, components functioning similar to the previously described components are indicated by primed reference numerals.

With references to FIGS. 6–7, the slide 44' includes a step 68, and the slide 44' will be located above the upper surface of the top plate 10'. This arrangement is required because of the location of the cooling water passage 38' as compared to its location in the embodiment of FIG. 2. The embodiment of FIGS. 6–9 operates in the manner identical to that previously described.

Figure 10:
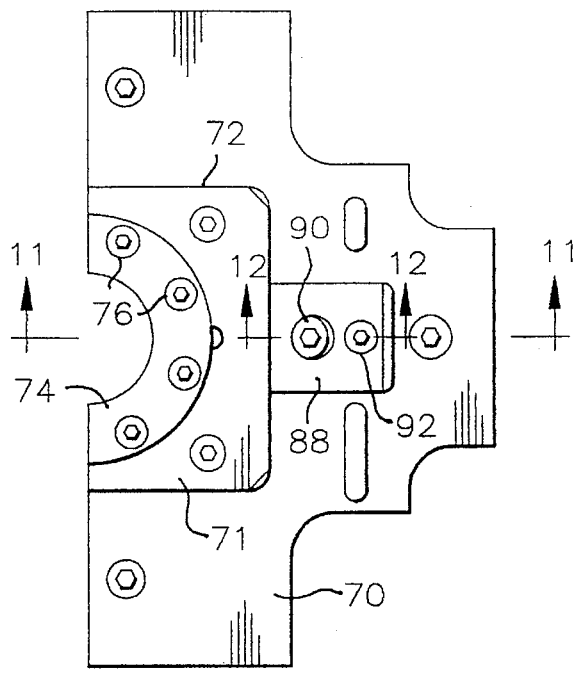
FIG. 10 is a plan view of a top plate and associated components illustrating a two piece shear steel holder.
Figure 11:
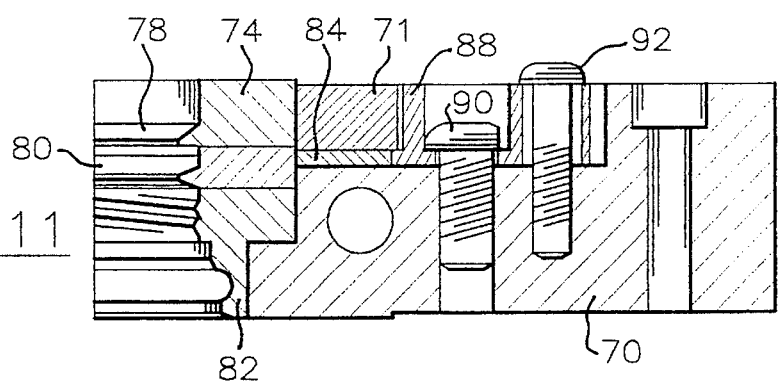
FIG. 11 is an elevational sectional view as taken along Section 11—11 of FIG. 10.
Figure 12:
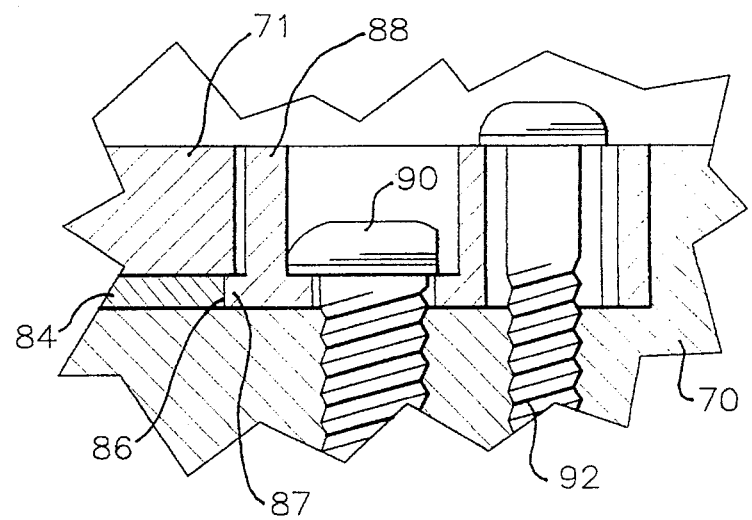
FIG. 12 is an enlarged elevational sectional view of a slide of the embodiment of FIGS. 10 and 11 as taken along Section 12—12 of FIG. 10.

FIGS. 10–12 illustrate an adjustable shear plate arrangement for two piece shear steels. In this embodiment, the top plate 70 includes a recess 72 in which the adjusting plate 71 is received and held in position by bolts. The shear steel holder 74 mounted in adjusting plate 71 uses bolts 76 to hold the shear steel in place and includes a homogeneously defined air seal 78, as will be appreciated from FIG. 11, and the air seal is an integral part of the holder 74, in contrast to the previously described embodiments wherein the air seal constituted a separate component.

The shear steel or plate 80 does constitute a separate component and is located immediately below the holder 74. The neck insert 82 is located upon the top plate 70 in the manner previously described.

As appreciated from FIGS. 11 and 12, an extension plate 84 is located beneath the adjusting plate 71 and the outer edge of the extension 84 engages the slide abutment side 86 of the slide lip 87 which extends under plate 71. The inner end of the extension 84 engages the outer edge of the shear steel 80 and rotation of the cam 90 will position the shear steel 80 relative to the holder 74. The slide 88 will be locked by the screw 92 as previously described. In this embodiment, only the shear steel 80 is inwardly adjusted and it is possible to adjust the shear steel or plate without adjusting the air seal.

The shear steel adjustment of the invention can be retrofitted to existing top blocks or supports by forming the recesses 16, 43 and 72 therein, or the invention may be incorporated into original blow molding equipment.

It is appreciated that various modifications to the inventive concepts may be apparent to those skilled in the art without departing from the spirit and scope of the invention.

We claim:

1. An adjustable shear plate for blow molding machines having at least two top blocks defining supports, the top block supports each supporting a shear plate holder, arcuate opposed shear plate segments mounted on the shear plate holders, the improvement comprising, shear plate holder adjustment means mounted on at least one of the supports interposed between a holder and the associated support for selectively movably positioning the associated holder relative to its support whereby the dimensional relationship between opposed shear plate segments can be adjusted to compensate for shear plate wear.

2. An adjustable shear plate for blow molding machines as in claim 1, said adjustment means mounted upon at least one of the supports comprising an adjustable actuator interposed between the associated support and shear plate holder.

3. An adjustable shear plate for blow molding machines as in claim 2, said actuator comprising a slide displaceably mounted on the associated support, a movable cam mounted on the associated support operatively connected to said slide and a lock mounted on the associated support selectively locking said slide with respect to the associated support.

4. An adjustable shear plate for blow molding machines as in claim 3, an abutment surface defined on said slide, a shaft rotatably received within the associated support, said cam being fixed on said shaft engaging said abutment surface and torque drive means defined on said shaft for rotating said shaft and cam.

5. An adjustable shear plate for blow molding machines as in claim 4, said shaft comprising a threaded screw having an axis threaded into a hole defined in the associated support, said cam comprising a head defined on said screw having an axis eccentrically related to said screw axis, said torque drive means being defined in said head.

6. An adjustable shear plate for blow molding machines as in claim 5, said lock comprising a screw threaded into the associated support having a head engaging the associated slide.

7. An adjustable shear plate for blow molding machines having a pair of top blocks, a top adjusting plate movably mounted on at least one top block, a shear plate mounted upon the adjusting plate, the improvement comprising, a slide movably mounted on the one top block in engagement with the associated adjusting plate, an actuator mounted on the associated top block adapted to displace said slide toward the adjusting plate to engage and adjust the position of the adjusting plate on its associated top block, and a lock mounted on the associated top block selectively locking said slide in an adjusted position.

8. In an adjustable shear plate for blow molding machines as in claim 7, said actuator comprising a shaft rotatably supported within the associated top block having an axis of rotation, a cam defined on said shaft engaging said slide and having an axis eccentrically related to said shaft axis, and torque drive means defined on said shaft for rotating said shaft and cam.

9. In an adjustable shear plate for blow molding machines as in claim 8, said lock comprising a screw threaded into the associated top block and a head defined on said screw engaging said slide, tightening of said screw locking said slide upon the associated top block.

10. In an adjustable shear plate for blow molding machines as in claim 7, said shear plate mounted on the adjusting plate being separately movable and adjustable with respect to the associated top adjusting plate, said actuator including a slide movably mounted on the associated top block, and a slide extension interconnecting said slide and said one separately movable shear plate whereby movement of said slide adjusts said one shear plate relative to its associated top block.

11. In an adjustable shear plate for blow molding machines as in claim 10, said actuator comprising a shaft rotatably supported within the associated top block having an axis of rotation, a cam defined on said shaft engaging said slide and having an axis eccentrically related to said shaft axis, and torque drive means defined on said shaft for rotating said shaft and cam.

12. In an adjustable shear plate for blow molding machines as in claim 11, said lock comprising a screw threaded into the associated top block and a head defined on said screw engaging said slide, tightening of said screw locking said slide upon the associated top block.

* * * * *